Aug. 21, 1945.    K. DEMB    2,382,979
VISCOMETER
Filed June 24, 1944

INVENTOR.
KENNETH DEMB
BY Lawrence Burns,
ATTORNEY

Patented Aug. 21, 1945

2,382,979

UNITED STATES PATENT OFFICE 2,382,979

VISCOMETER

Kenneth Demb, Salem, Mass., assignor to Sylvania Electric Products Inc., Salem, Mass., a corporation of Massachusetts Application June 24, 1944, Serial No. 541,926

4 Claims. (Cl. 73—59)

This invention relates to an apparatus for measuring viscosity and particularly to a means for continuously indicating the viscosity of a continuously renewed liquid sample.

In many industries the successful, economical, and uniform production of their products depends upon a very close check upon the characteristics of the materials used in their production systems and upon their final products. One such case arises where volatile coating liquids are used. To maintain the liquid at the correct viscosity, solvents must be added from time to time, and to determine the state of the liquid and how much solvent is required, a careful test of its viscosity must be made at frequent intervals. The present invention provides an accurate and efficient means for constantly and automatically indicating the viscosity of the liquid.

An object of the invention is to provide means for obtaining continuous indications of the viscosity of a body of liquid during the period in which it is being consumed, or during which it is being processed in any way tending to cause a change in its viscosity.

A further object of the invention is to provide means for automatically and continuously indicating the viscosity of a body of liquid which is continuously being consumed and replaced.

A further object of the invention is to provide means for continuously sampling and testing the viscosity of a body of liquid.

A further object of the invention is to provide a continuously acting viscometer which automatically samples and maintains standard conditions in the sample during the test period.

Other objects and features of the invention will more fully appear from the following description, in connection with the accompanying drawing and will be particularly pointed out in the claims.

Figures 1, 2:
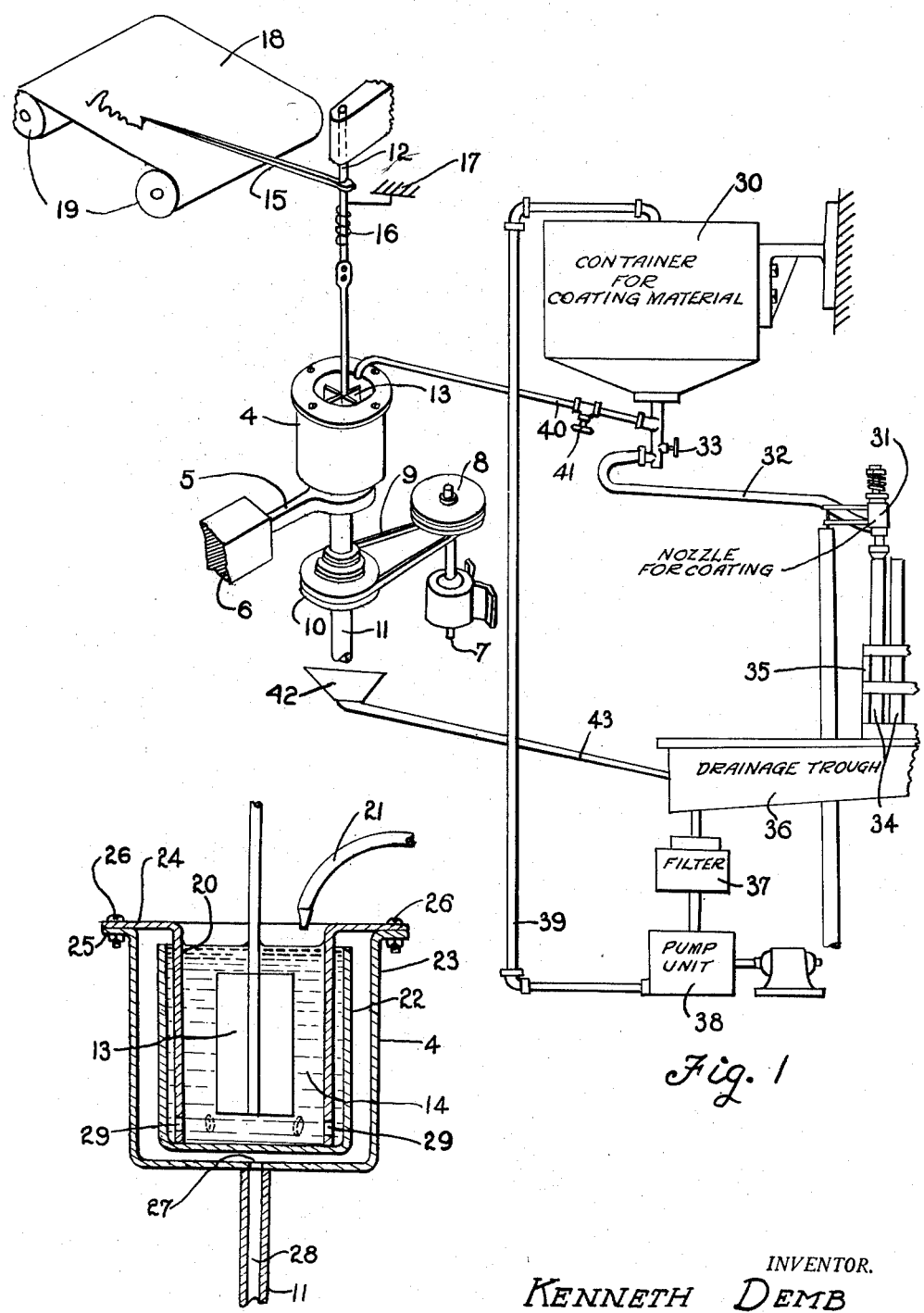
Figure 1 is a diagrammatic view of an apparatus embodying the invention.
Figure 2 is a cross-sectional view through the receptacle containing the sample under test.

The principles of the invention may be applied to any product or industry wherein it becomes necessary to control the viscosity of the material used, or the end product. The invention is particularly useful in maintaining a continuous check on production line operations where a supply of viscous liquid must be kept at a predetermined consistency. By way of illustration, the invention will be described in connection with an apparatus for applying fluorescent coating material to the inner surface of the cylindrical envelopes of fluorescent lamps.

The viscometer illustrated functions upon the principle wherein a torque is developed in a pivoted shaft by the drag upon a paddle or vane secured to the shaft and immersed in the sample. The sample is contained in a rotating receptacle, and the position of a pointer fixed to the shaft indicates the viscosity of the sample upon a scale calibrated in suitable units.

The sample of liquid to be tested is contained in the receptacle 4 which is rotatably mounted in a bearing bracket 5, rigidly secured to a fixed support 6. The receptacle 4 is rotated in any suitable manner such as by means of a motor 7 upon the shaft of which is mounted a pulley 8, over which a belt 9 traverses and which acts to drive a pulley 10 upon a shaft 11 which supports and rotates the receptacle 4. Means are provided for changing the rotational speed of the receptacle. Any suitable device may be used such as providing steps of different diameter upon the pulleys. By shifting the belt 9 from step to step, the desired speed may be selected.

A delicately pivoted shaft 12 is positioned in axial alignment with the shaft 11 and is provided with a paddle 13 which is immersed in the sample liquid 14. Desirably, the paddle is so connected to the shaft 12 that it is readily detached to be replaced with a paddle of a different type more suitable to liquids of a different viscosity range. An indicating or recording pointer 15 is secured to the shaft 12.

A spiral spring 16 surrounds and is secured at one end to the shaft 12, and at its other end to a fixed point 17. Desirably, the pointer is arranged to move over a scale or chart 18 which is calibrated to indicate the viscosity of the liquid under test. If desired, the chart may be of the recording type, and the tip of the pointer provided with a pen, whereby a graph of the density variation in the liquid is automatically recorded on the chart over an extended period of time. The chart may be driven by clockwork not shown, acting to drive the rolls 19.

The rotation of the receptacle 4 rotates the liquid sample which subjects the liquid to shear against the blades of the vane or paddle. A torque is thus transmitted to the shaft 12 which flexes the calibrated spring 16, to cause the pointer to indicate the viscosity of the liquid.

An important feature of the invention resides in the construction of the receptacle 4. This vessel is so constructed that during its operation the liquid level therein is maintained constant, despite the fact that fresh fluid is being continuously fed thereto. The receptacle is composed of three main components, an inner cup 20, desirably of thin metal into which the liquid to be tested flows from the nozzle 21. Another cup 22 surrounds the cup 20 and is secured thereto. The two cups 20 and 22 are in turn received within an overflow vessel 23. To facilitate cleaning the various cavities formed between the cups, means is provided to enable the cups 20 and 22 to be removed from the cup 23. This may be done in any desired manner. A suitable means is illustrated in Figure 2, wherein the cups 20 and 23 are provided with outwardly turned flanges 24 and 25 which are detachably connected by screws or bolts 26.

The outer cup 23 is secured upon the upper end of the shaft 11 and has an aperture 27 therein which communicates with an opening 28 extending through the shaft 11. The bottom portion of the inner cup 20 is perforated with a plurality of apertures 29, providing free communication between the cup 20 and the cup 22. The position of the upper rim of the cup 22 determines the correct level of liquid in the cup 20. When liquid is fed to the cup 20, it will also flow into the cup 22 through the apertures 29. When the established level is reached and the liquid continues to flow into the cup 20, it will flow through the apertures 29 into the cup 22 and overflow into the cup 23. The correct liquid level is thus automatically maintained. The overflow from the cup 20 flows into the cup 23 and thence out through the opening 20 in the shaft 11. It should be noted that at the higher speeds of rotation, the liquid surface will assume a concaved contour and the height of the rim of the cup 22 should be calculated to maintain a proper average liquid level in the cup 20.

Inasmuch as the sample under test may constantly be changed during the operation of the meter, its application to continuous operation production becomes very valuable to the manufacturer. An application to the coating of fluorescent lamps is diagrammatically illustrated in Fig. 1 wherein a container 30 holds a supply of viscous fluorescent material which feeds by gravity to one or more coating heads 31 through a pipe line 32. The flow of liquid is controlled by a valve 33. The coating head is provided with a suitable valve and nozzle for applying a quantity of the liquid against the inner wall of lamp tubes 34, held vertically in a rack 35. The liquid then flows downward through the tubes and any surplus material drains off into a trough 36 from where it flows through a filter 37 into a motor driven pump unit 38 from where it is returned to the container 30 through a pipe line 39.

To sample and test the liquid, a means is provided for bypassing a small volume of the liquid to the receptacle 4. This may be done in any suitable manner, such as by means of a small pipe line 40, leading from the bottom of the container 30 to the cup 20 of the receptacle 4. To regulate the flow to the cup, a valve 41 is provided. The overflow from the sampling cup passes into a collecting funnel 42 from where it flows into the trough 36 through a pipe 43 and is pumped back into the container 30.

The apparatus shown provides a continuous and immediate check upon the viscosity of the liquid at all times during the operation of the coating apparatus. Furthermore, a permanent record of the condition of the liquid may be obtained from the chart 18.

What I claim is:

1. In a viscometer having rotating means acting to develop a recordable torque force in proportion to the shear characteristic of the sample, a container for the sample comprising a first cup for receiving the sample to be tested, a second liquid tight cup surrounding the first cup and having its upper rim coinciding with a predetermined liquid level below the rim of said first cup, there being apertures adjacent the bottom portion of said first cup and communicating with said second cup and an overflow cup embracing both cups and having means for conducting away the overflow of liquid from said second cup.

2. In a viscometer of the type in which a rotating sample develops a recordable torque upon a vane immersed therein, a container comprising a first cup in which the sample is received, a second cup surrounding and in communication with the bottom portion of said first cup, the rim of said second cup being positioned to maintain a predetermined average liquid level a short distance below the rim of said first cup, an overflow cup embracing and supporting said first and second cups and a rotatable shaft upon which said cups are mounted having a longitudinal opening extending therethrough and in communication with said overflow cup.

3. In a viscometer of the type having rotating means acting to develop a recordable torque force in proportion to the shear characteristic of the liquid to be tested; a liquid sample container having a first cup to receive the liquid, a second cup surrounding said first cup and communicating therewith at its lower portion, said second cup presenting a rim positioned to maintain a predetermined average liquid level a short distance below the rim of said first cup, an overflow cup embracing both of said other cups, means for continuously feeding liquid to said first cup and means for draining the liquid from said overflow cup, whereby a continuous indication of the viscosity of a continuously changing sample is presented.

4. In combination with a supply vessel of viscous liquid which is being consumed in the fulfillment of a given objective; means for continuously sampling and indicating the viscosity of said liquid, said means including a viscometer of the type in which a rotating sample develops a recordable torque force upon a vane immersed therein, said viscometer including a container for a liquid sample having a first cup for receiving the sample, a second cup communicating with and surrounding the first cup, said second cup presenting a rim disposed in position to maintain a predetermined average liquid level a short distance below the rim of said first cup and an overflow cup in which the other cups are received, means for continuously conducting liquid from said vessel of viscous liquid to said first cup and means for collecting and returning the liquid from said overflow cup to said vessel.

KENNETH DEMB.